July 3, 1962 D. WEISE 3,042,411

RECORD PLAYERS

Filed May 27, 1960 2 Sheets-Sheet 1

INVENTOR

Dominikus Weise

BY Fisher Christen & Goodson

ATTORNEYS

July 3, 1962 D. WEISE 3,042,411

RECORD PLAYERS

Filed May 27, 1960 2 Sheets-Sheet 2

INVENTOR

Dominikus Weise

BY Fisher Christen & Sabol

ATTORNEYS

United States Patent Office 3,042,411

Patented July 3, 1962

3,042,411

RECORD PLAYERS

Dominikus Weise, Munich, Germany, assignor to Perpetuum-Ebner, Fabrik für Feinmechanik und Elektrotechnik Steidinger & Co. Kommanditgesellschaft, a corporation of Germany Filed May 27, 1960, Ser. No. 32,199
9 Claims. (Cl. 274—14)

The present invention relates to improvements in record players or record changers, and it is the principal object of the invention to provide a mechanism for guiding the tone arm of a record player or record changer so as to move automatically toward and upon a phonograph record on the turntable of the apparatus to start playing the record at the very beginning of its sound groove.

There have been prior disclosures of mechanisms of a similar kind in which the tone arm when in the inoperative position rests on a supporting device of a relatively complicated structure which is pivotably mounted and has a slideway along which the tone arm may slide downwardly by its own gravity in the direction toward the record on the turntable when the supporting device is tilted, so that the needle will then automatically enter the starting groove of the record. These known devices may, however, be used only for records of a certain size, and they also require a rather complicated mechanism for guiding and moving the tone arm. This applies also to other known devices of the mentioned kind, and all of them have the disadvantage of requiring a considerable number of parts, as well as very accurate adjustments and special adjusting means so as to insure a proper operation of the device and an accurate insertion of the needle into the starting groove of the record. The production of such devices is therefore obviously very expensive, and for this reason such automatic control mechanisms for tone arms are hardly ever applied to normal record players, but only to expensive automatic record changers. In normal record players, the needle is therefore usually still placed on the record by hand which often results in damage to the record.

It is another object of the present invention to provide an automatic tone-arm guiding and starting mechanism which overcomes the above-mentioned disadvantages and is of a very simple and inexpensive construction, and is therefore applicable not only to automatic record changers but also to normal record players.

A further object of the invention is to provide a mechanism of the mentioned kind which comprises a stationary slideway along which the tone arm of the record player may slide downwardly by its own gravity toward and against the record, and which further comprises means for then automatically raising the tone arm and moving it to a position in which the phonograph needle is disposed exactly above the starting groove of the record, and for then lowering the tone arm so that the needle will enter the starting groove.

A further object of the invention is to provide such a mechanism which may be used in connection with records of different sizes and which will be automatically adjusted in accordance with the speed at which the particular record should be played.

These objects are attained according to the invention by providing a slideway for the tone arm which is mounted in a stationary position and forms an inclined plane, the upper end of which is associated with a releasable device which is adapted to hold the tone arm at this end and the lower end of which leads the tone arm after it has been released and slides down the slideway, to the edge of the record, which position serves as a key position for the subsequent movement of the tone arm to slide the needle into the starting groove of the record. The inventive arrangement is of a relatively simple structure and applicable to records of any conventional size without requiring any special adjustment when changing from a record of one size to one of another size. According to the invention, the tone arm is guided along the inclined slideway in the direction toward the outer edge of the record in order first to determine the size of the respective record. Only when this has been done, the needle will be inserted into the starting groove of the record and the size of the record does not affect this movement in any manner. The inclined slideway may consist of a simple inclined track which is solidly connected to the base plate of the apparatus. There is no tilting mechanism required and the manipulation of the device is extremely simple. Furthermore, the device according to the invention for guiding the tone arm to the record may be combined with a mechanism which permits the turntable to be adjusted to whatever speed may be required for the particular record.

These and other objects, features, and advantages of the present invention will become further apparent from the following detailed description thereof, particularly when read with reference to the accompanying drawings, in which FIGURE 1 shows a top plan view of a record player which is provided with the device according to the invention;

FIGURE 4 shows a side view of the apparatus according to FIGURE 1, partly in a cross section taken along line IV—IV of FIGURE 1; while

Figures 1, 2:
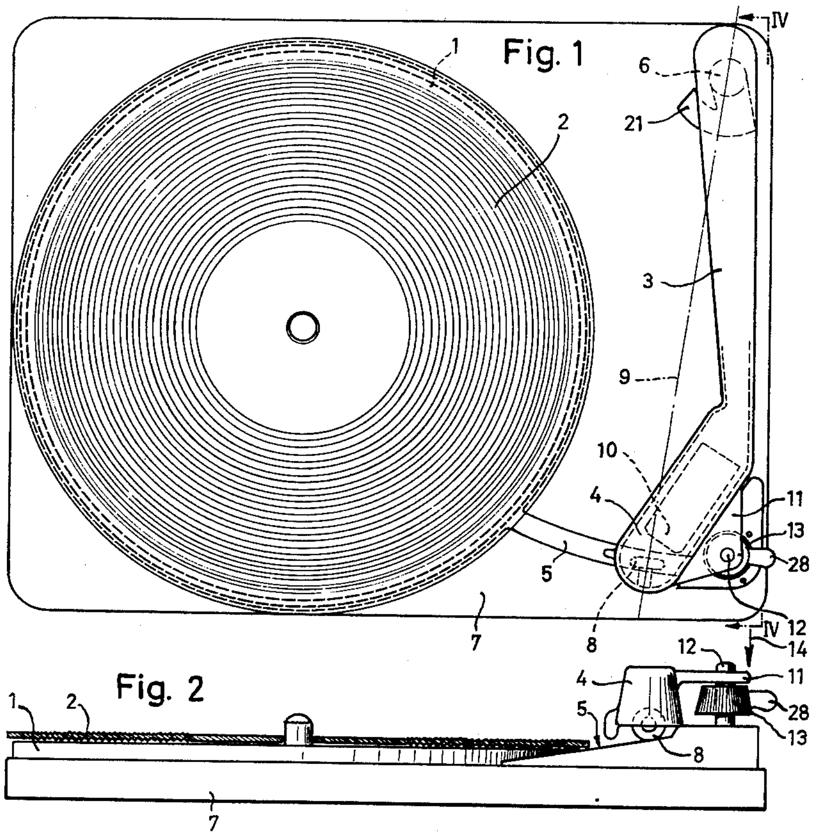
FIGURE 2 shows a front view thereof.
Figure 4:
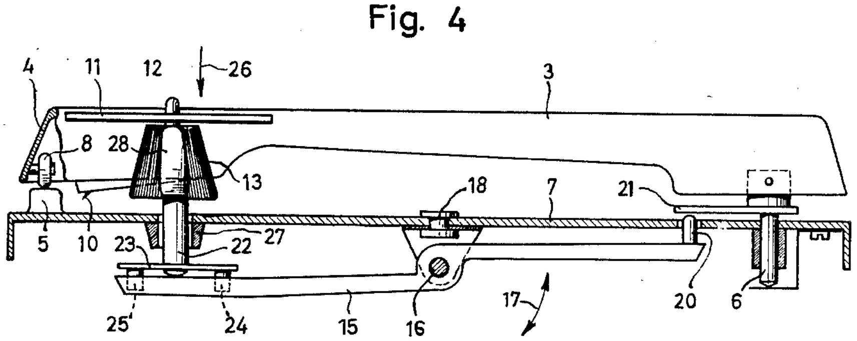

The record player illustrated in the drawings has a turntable 1 upon which a phonograph record 2 may be placed. The tone arm 3, which is shown in FIGURE 1 in its inoperative position carries on its free end the sound head 4 underneath which an inclined slideway 5 is solidly mounted on the base plate 7 of the record player. This slideway 5 forms an inclined surface which leads downwardly toward the edge of turntable 1 and is of an arcuate shape, the center of curvature of which coincides with the swivel axis 6 of the arm 3. When not in use, tone arm 3 is secured by a locking device 11, 12 in its inoperative position in which sound head 4 rests on the upper end of slideway 5. After the locking device is released, tone arm 3 slides downwardly along slideway 5 due to its own gravity until it engages with the edge of the record. Sound head 4 carries a freely rotatable roller 8 which engages with the inclined surface of slideway 5 and supports the sound head and tone arm thereon. This roller 8 rotates about an axis 9, the extension of which, as indicated in FIGURE 1, intersects with the swivel axis 6 of tone arm 3. In FIGURE 4 it may be seen that the lowest point of roller 8 on sound head 4 is disposed at a higher level than the point of the phonograph needle 10.

The locking device for securing tone arm 3 in its inoperative position near the lateral edge of base plate 7 includes a bracket 11 which is secured to and projects horizontally from sound head 4. This bracket is provided with a bore into which a locking pin 12 is adapted to engage which is secured to a control knob 13. This control knob 13 may also be used for starting the playing of a record. In this case, control knob 13 is depressed, whereby locking pin 12 is moved downwardly in the direction of arrow 14 in FIGURE 2 until it is fully withdrawn from the bore in bracket 11 so that the tone arm will be released to swivel about its axis 6 and the sound head 4 can slide downwardly along the inclined surface of slideway 5 until it engages with the edge of the record 2 lying on the turntable. By this engagement of sound head 4 at the end of its sliding movement along slideway 5, the sound head therefore automatically determines the size of the particular record and thereby initiates the subsequent movement during which the phonograph needle 10 is inserted into the starting groove of the record.

Figure 5:
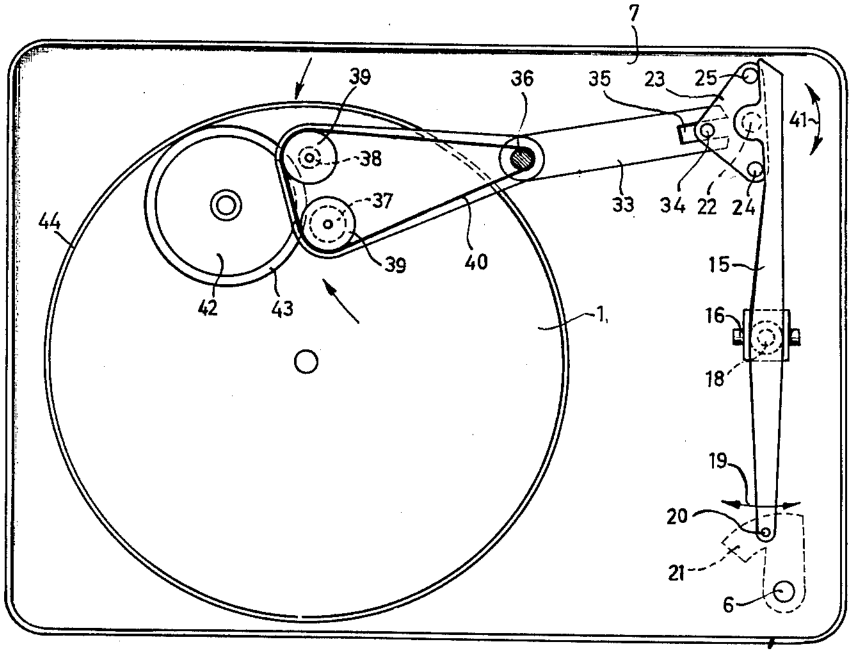
FIGURE 5 shows a bottom view of the apparatus according to FIGURE 1.

For raising the tone arm above the level of the record and then swiveling it over the edge of the record, and then lowering it so as to insert needle 10 into the starting groove of the record, a two-armed lever 15, as shown in FIGURES 4 and 5, is provided underneath base plate 7 and mounted on a pin 16 so as to be pivotable in a vertical direction, while pin 16 is mounted on a bracket which, in turn, is mounted on a pin 18 so as to be rotatable in the horizontal direction. Lever 15 is therefore pivotable in two directions, namely, in a vertical direction as indicated in FIGURE 4 by the double-arrow 17, and in a horizontal direction as indicated by the double-arrow 19 in FIGURE 5. At one end, lever 15 carries a pin 20 which is adapted to pass through an aperture in base plate 7 to engage with a plate 21 which is secured to tone arm 3, while at the other end, lever 15 is adapted to engage with the lower end 22 of pin 12 on which control knob 13 is mounted and which is slidable within a bushing 27 on base plate 7. Lever 15 further engages laterally on pins 24 and 25 which are secured to a plate 23 which is also mounted on pin 22.

Figure 3:
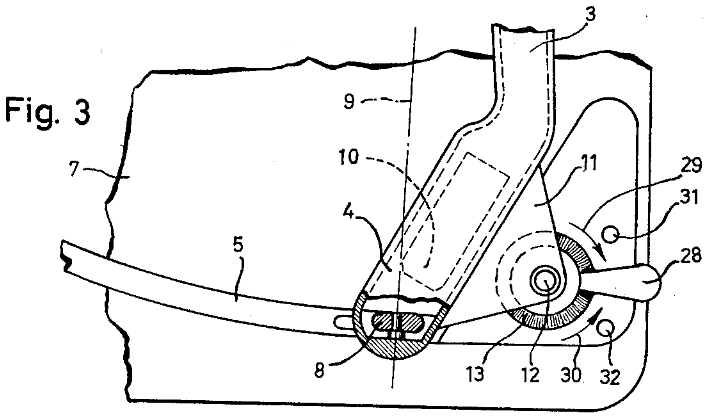
FIGURE 3 shows an enlarged top plan view of a part of the apparatus according to FIGURE 1.

After control knob 13 has been depressed so that locking pin 12 disengages from bracket 11 and releases tone arm 3 to slide downwardly along slideway 5, and after the tone arm engages with the edge of the record on turntable 1, control knob 13 is further depressed in the direction of arrow 26 shown in FIGURE 4 until its lower surface engages with base plate 7. By this movement, lever 15 is pivoted by pin 22 in a counterclockwise direction about the axis of pin 16 so that pin 20 on the other end of the lever will act upon plate 21 and thereby lift tone arm 3 to such an extent that the point of the needle 10 will be disposed at a level higher than the upper surface of the record. Thereupon, control knob 13 is turned by means of the handle 28 either in the direction of arrow 29 or of arrow 30, as shown in FIGURE 3, until the handle engages with pin 31 or pin 32, respectively. By this movement, plate 23 will also be turned in one or the other direction, whereby one or the other of pins 24 and 25 will be pressed against lever 15 to swivel the same within a substantially horizontal plane about the axis of pin 18 in the direction of arrow 19. Due to the friction between pin 20 and plate 21 which is preferably provided with a friction surface, pin 20 will then take along the raised tone arm and shift the same laterally until the sound head will be disposed above the starting groove of the record. For this purpose, the two stop pins 31 and 32 are fixed in such a position that, when handle 28 is turned so as to engage with one pin or the other, the tone arm will be swiveled to such an extent that the needle on the sound head will be exactly above the starting groove. If control knob 13 is then released, lever 15 will be pivoted by the weight of the tone arm in the clockwise direction about pin 16, whereby the tone arm will be lowered by gravity at the proper speed until the needle enters into the starting groove of the record.

By suitable electric control means, not shown, the rotary movement of control knob 13 may also be utilized to start the motor, also not shown, for driving the turntable. The starting movement of the control knob therefore consists of three steps, in that the knob is at first depressed in two stages, then turned, and finally released, whereupon it will again return to its raised position under the action of a spring, not shown. The elements previously mentioned transmit these individual movements of control knob 13 in such a manner that, as soon as the record player is switched on, the tone arm will be raised and then swiveled about a predetermined angle so that the sound head will be above the starting groove of the record, whereupon the tone arm will be lowered until the needle engages into the starting groove.

Through the triangular plate 23 on pin 22, control knob 13 is also connected to a two-armed setting lever 33 by means of which the turntable 44 may be adjusted to rotate at the proper speed required for the particular size of record. For this purpose, plate 23 has a further pin 34 which is inserted into and slidable within a slot 34 in one end of setting lever 33, which is pivotably mounted on a pin which is disposed at the point 36 and carries near its other end a pair of friction rollers 37 and 38 of different diameters which are adapted to be driven by the shaft of the motor through a belt 40 which is preferably resilient and runs over a pair of pulleys 39 which are secured to and coaxial with rollers 37 and 38, respectively. The shaft of the motor is preferably disposed coaxially with the pin at 36. As previously mentioned, the motor may also be switched on by the operation of control knob 13 through suitable switch elements, not shown. When control knob 13 is turned in one direction or the other lever 33 will likewise be pivoted, as indicated in FIGURE 5 by the double-arrow 41, and to such an extent that either the friction roller 37 or the friction roller 38 will be moved into engagement with a friction coating 43 on a wheel 42 which, in turn, engages with the inner surface of a rim 44 on turntable 1 so as to drive the latter. It therefore depends upon the direction of rotation of control knob 13 by the movement of handle 28 toward stop pin 31 or toward stop pin 32, whether friction roller 37 or friction roller 38 will be moved into engagement with the friction coating 43 on wheel 42. Since the speed at which phonograph records are to be driven is generally standardized in accordance with their difference in size so that conventional records of a diameter of 25 or 30 cm. are usually to be rotated at a speed of 33⅓ r.p.m., while records of a diameter of 17.5 cm. are usually to be rotated at a speed of 45 r.p.m., the two directions of rotation of control knob 13 or the two stop pins 31 and 32 may simply be marked "large record" and "small record" so that, when manipulating the control knob, one only has to see that the knob will be turned to the marking which corresponds to the size of the particular record to be played. The different control operations as previously described will then be started automatically in the proper order of succession. When operating the control knob, the tone arm will therefore first be unlocked to permit it to slide downwardly toward the turntable, while simultaneously the motor of the record player will be switched on, whereupon one or another speed of the turnable will be selected in accordance with the particular record to be played.

The operation of lever 15 for raising and lowering the tone arms may also be carried out by a cam plate which is actuated by the control knob.

Although my invention has been illustrated and described with reference to the preferred embodiment thereof, I wish to have it understood that it is in no way limited to the details of such embodiment but is capable of numerous modifications within the scope of the appended claims.

Having thus fully disclosed my invention, what I claim is:

1. In a record player having a turntable adapted to support a phonograph record, driving means for rotating said turntable, a tone arm pivotable relative to said turntable and having a sound head at one end thereof adapted to hold a needle, and means for guiding said tone arm from an inoperative position spaced from said turntable toward said turntable and upon a record thereon, said means comprising an inclined stationary slideway at one side of said turntable for sliding said tone arm by gravity from said inoperative position near the upper end of said slideway downwardly toward said turntable and to a position in engagement with the edge of the record, locking means for maintaining said tone arm in said inoperative position, means for releasing said locking means to permit said tone arm to slide downwardly along said slideway, and means for moving said tone arm from said engaging position over the edge of said record to insert said needle into the starting groove of said record.

2. In a record player as defined in claim 1, in which said moving means including a lever for lifting said tone arm from said engaging position to a level above the upper surface of said record, a cam for swiveling said tone arm about a predetermined angle over the edge of said record, and for then lowering said tone arm so as to insert said needle into the starting groove of said record.

3. In a record player as defined in claim 1, in which said guiding means further comprise a control knob adapted to be depressed from a raised position and also to be turned in either direction when depressed, and means connecting said locking means to said control knob to release said locking means.

4. In a record player as defined in claim 3, further having electric circuit means, said control knob being operatively connected to said circuit means for starting said driving means and for playing a record by a manipulation of said knob.

5. In a record player as defined in claim 3, in which said transmitting means further comprise means associated with said control knob for swiveling said tone arm in only one direction regardless of the direction in which said knob is turned, and means for adjusting said driving means to rotate said turntable at different speeds depending upon the direction in which said cotrol knob is turned.

6. In a record player as defined in claim 3, in which said transmitting means further comprise means for connecting said driving means to said turntable to drive the same, and means associated with said control knob for adjusting said connecting means so that said turntable will be driven at one speed when said control knob is turned in one direction and so that said turntable will be driven at another speed when said control knob is turned in the other direction.

7. In a record player as defined in claim 1, in which said guiding means further comprise a control knob, said control knob being first movable from one position in a downward direction and then adapted to be turned in either direction and finally to be lifted to its original level, means for limiting the turning movement of said knob in either direction, and transmitting means for converting these movements of said knob to lift said tone arm from said engaging position, then to swivel the same about a predetermined angle over the edge of the record, and then to lower said tone arm so as to insert said needle into the starting groove of said record.

8. In a record player as defined in claim 1, in which said guiding means further comprise a control knob adapted to be depressed and thereafter to be turned in either direction, means for limiting the distance at which said control knob may be depressed and turned in either direction, said locking means comprising a member mounted on said tone arm and having an aperture therein, and a member on said control knob adapted to engage into said aperture to hold said tone arm in said inoperative position and to be withdrawn from said aperture to release said tone arm when said control knob is initially depressed, a two-armed lever having one end adapted to engage with said tone arm, means for mounting said lever so as to be pivotable about a horizontal axis and also about a vertical axis, a member connected to said control knob for pivoting said lever near the other end thereof about said horizontal axis when said knob is further depressed for lifting said tone arm in said engaging position to a point above the edge of said record, and a control member connected to said control knob for pivoting said lever in only one direction about said vertical axis when said control knob is turned in either direction for swiveling said tone arm from said point above the edge of said record to a point above the starting groove of said record, said control knob when being released after being depressed and turned adapted to be lifted to its original level and thereby permitting said tone arm to be lowered to insert said needle into said starting groove of said record, said driving means comprising a motor, a pair of rotatable transmitting means adapted to be driven by said motor at different speeds, and means connected to said control member for connecting one of said transmitting means with said turntable to drive said turntable at one speed when said control knob is turned in one direction and for connecting the other transmitting means with said turntable to drive said turntable at another speed when said control knob is turned in the other direction.

9. In a record player having a turntable adapted to support a phonograph record, comprising in combination, a base-plate supporting said turntable, a tone arm pivoitally mounted on said base-plate, and having a sound head at one end thereof adapted to hold a needle, means for guiding said tone arm from an inoperative position spaced from said turntable towards said turntable into the starting groove of said record, said means comprising an inclined stationary slideway at one side of said turntable for guiding said turntable from said inoperative position to a second position wherein said tone arm is in engagement with the edge of said record, and positioning means for moving said tone arm from said second position over the edge of said record to a third position wherein said needle is in the starting groove of said record.

References Cited in the file of this patent

FOREIGN PATENTS

| | | |
|---|---|---|
| 156,060 | Great Britain | Mar. 17, 1921 |
| 582,262 | Great Britain | July 10, 1944 |